June 13, 1939.    I. A. WEAVER    2,161,886
HEADLIGHT TESTER
Filed Aug. 31, 1936    4 Sheets-Sheet 2
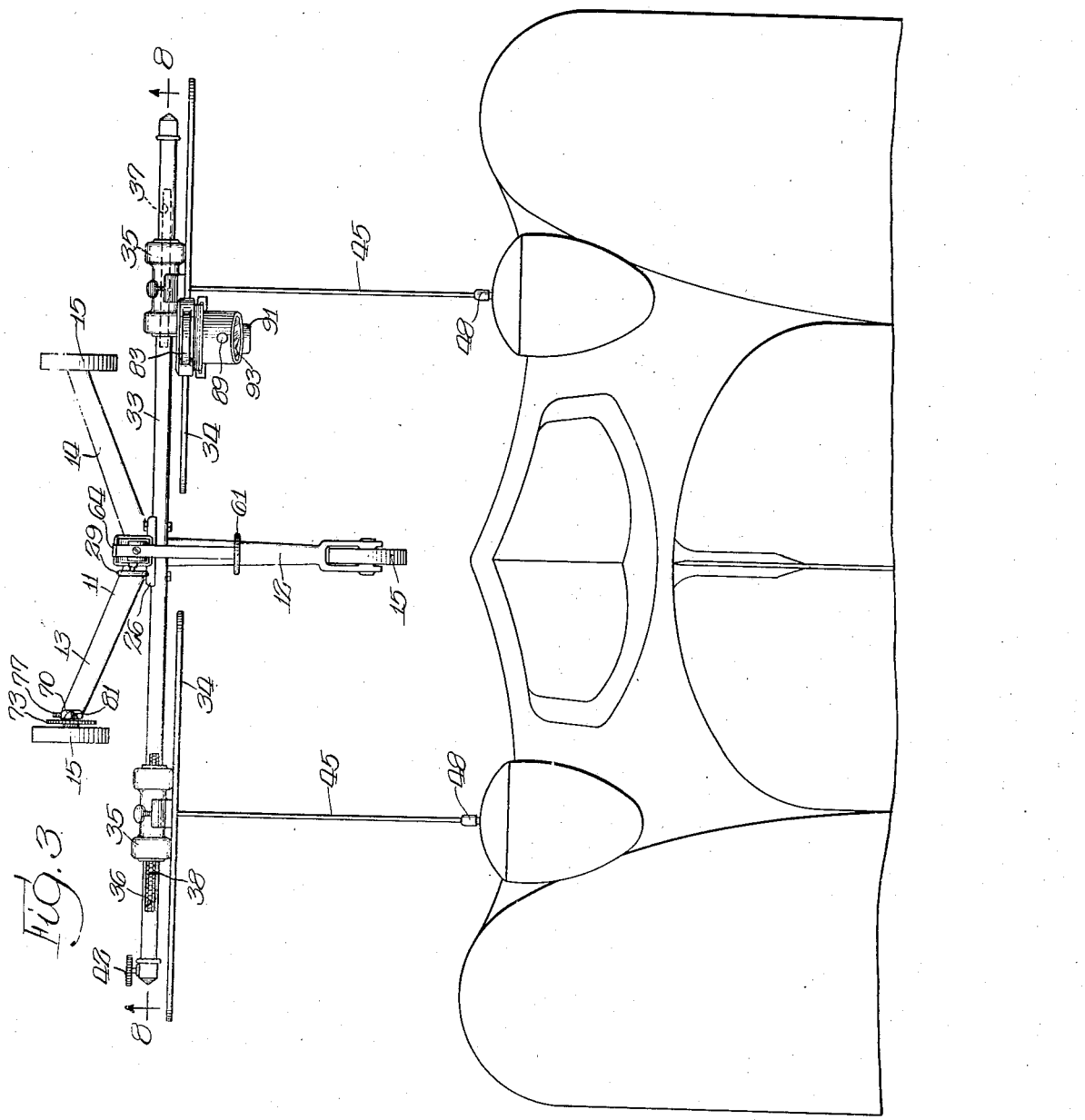
Inventor:—
Ira A. Weaver
By Walter M. Fuller
Atty.

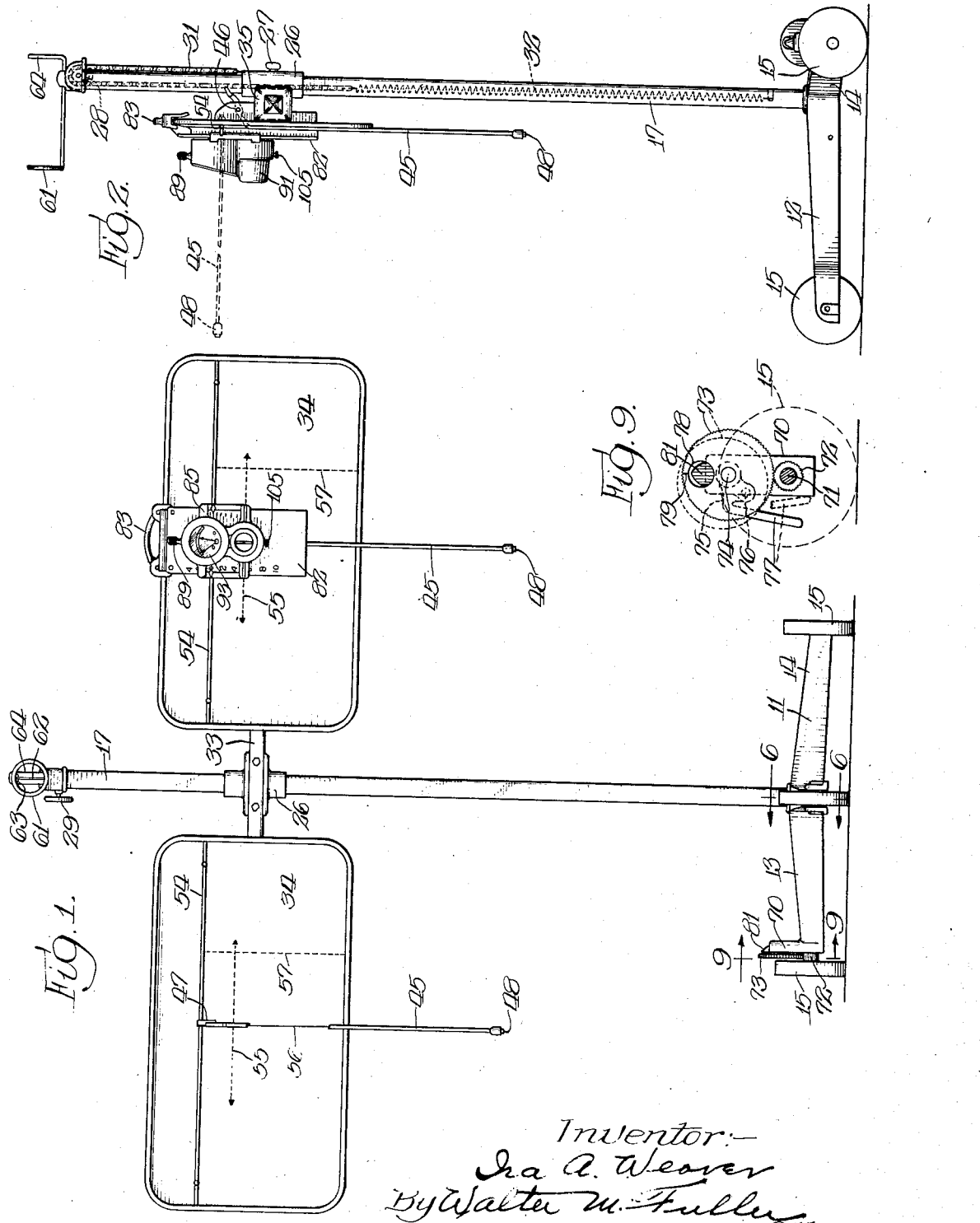

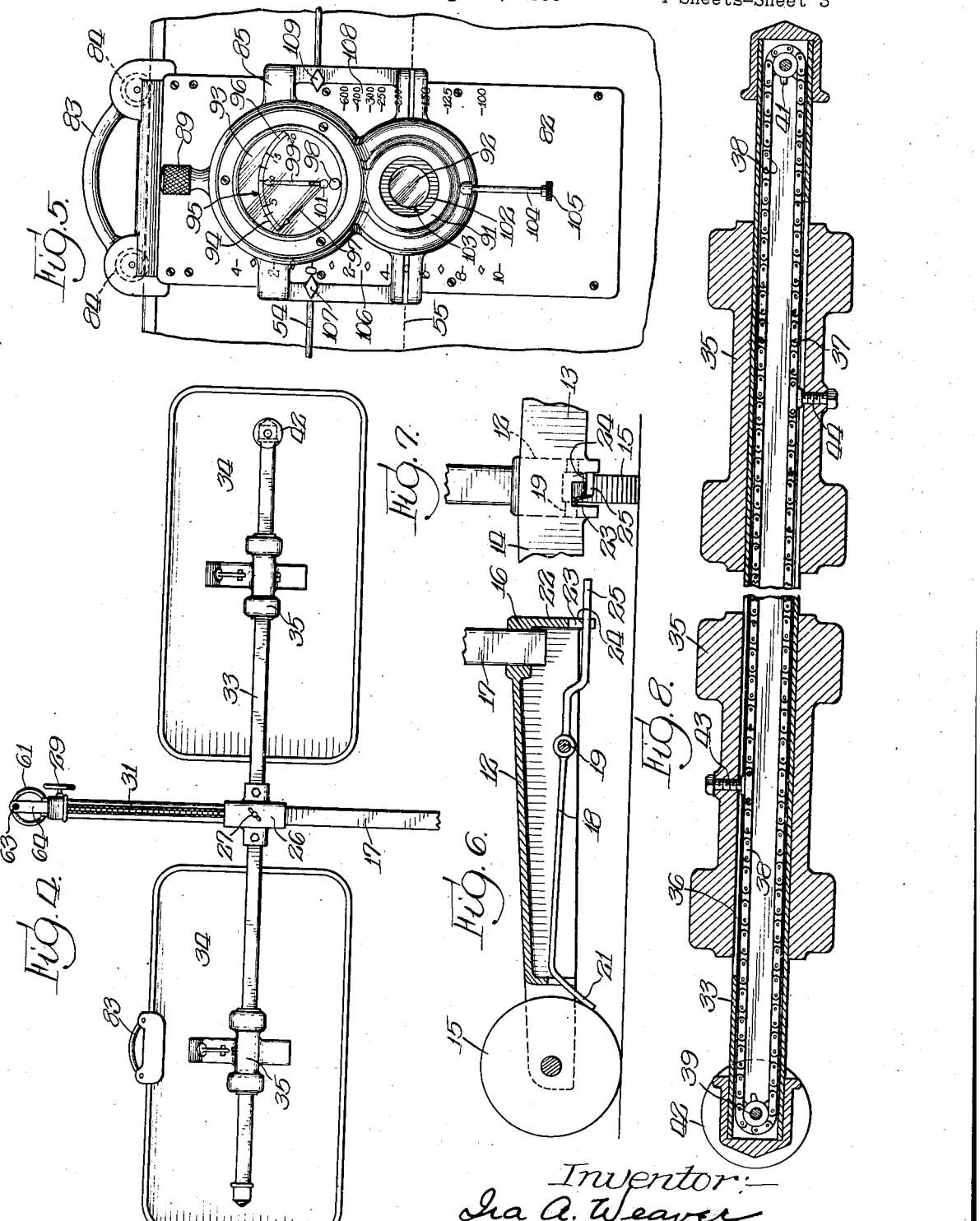

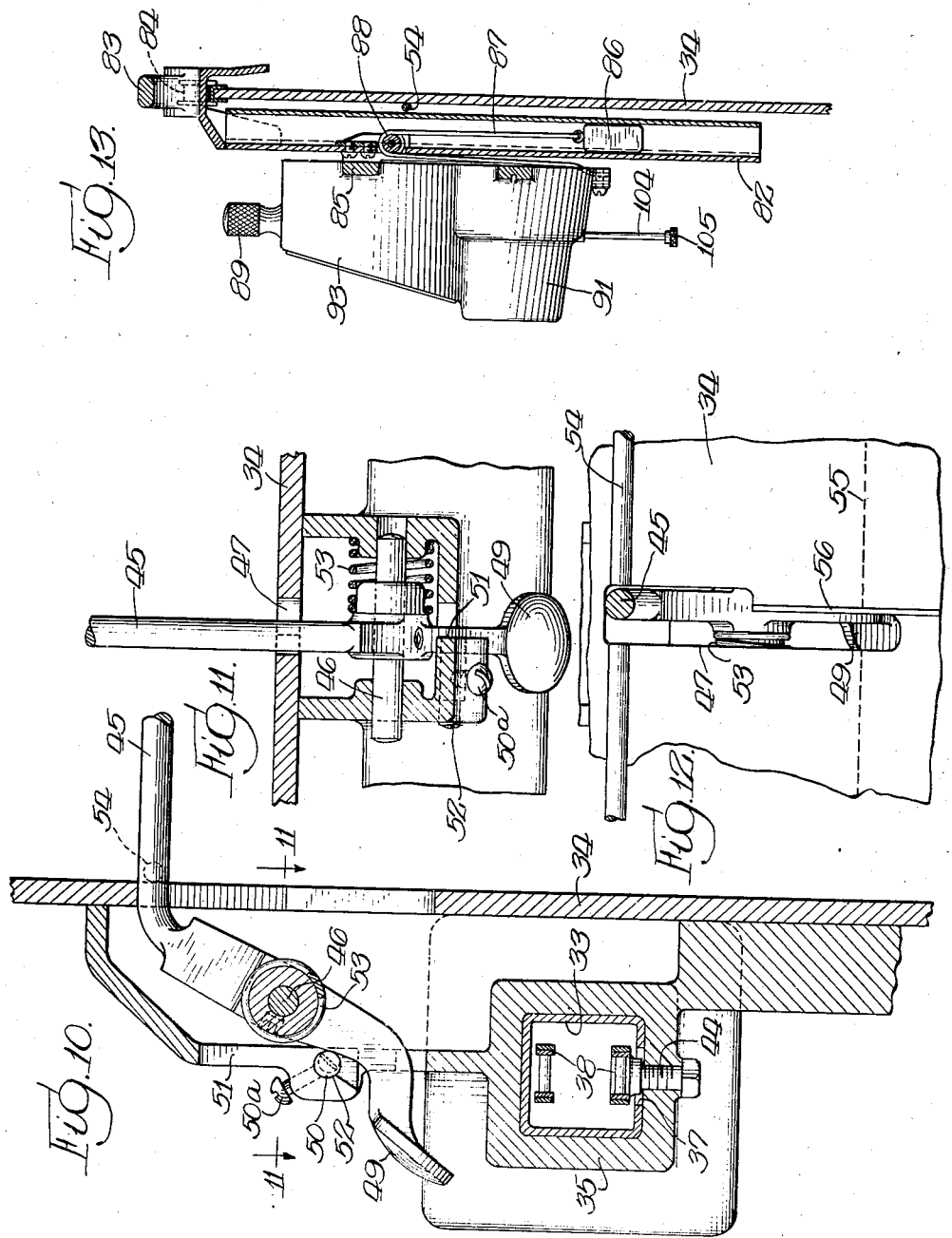

Patented June 13, 1939

2,161,886

UNITED STATES PATENT OFFICE 2,161,886

HEADLIGHT TESTER

Ira A. Weaver, Springfield, Ill., assignor to Weaver Manufacturing Company, Springfield, Ill., a corporation of Illinois Application August 31, 1936, Serial No. 98,730

2 Claims. (Cl. 88—14)

My present invention relates to novel and advantageous means for testing the headlights of automobiles and it also pertains to features of betterment suitable for use in analogous appliances.

In order to subject the headlights of an automobile to trial, it is desirable to place suitable screen-means at a definite and predetermined distance ahead of the headlamps and at right-angles to the length of the car, so that the light-beams from the head-lamps may be played thereon to allow inspection of their patterns and their modifications as their active filaments are rendered operative or inoperative.

Such screen-means may also conveniently afford suitable supporting means for an adjustable photoelectric-cell by means of which the direction and intensity of the light-beams from the head-lamps may be studied and suitable adjustment made.

The instant invention pertains to certain features of betterment in appliances of this type.

To enable those acquainted with this art to understand the invention fully, a present, preferred embodiment thereof has been illustrated in the accompanying drawings throughout the several views of which like reference numerals have been employed to designate the same parts, this structure being described in detail below.

In these drawings:

Figure 1 is a front elevation of the new and improved headlight-tester with the measuring rods down in inoperative positions;

Figure 2 is a side view of the same;

Figure 3 is a plan view of the tester showing its initial position in front of the headlamps of the automobile to be examined;

Figure 4 is a rear elevation of the top portion only of the appliance;

Figure 5 is a face view of the photoelectric-cell part of the apparatus;

Figure 6 is a vertical section through one leg of the base of the tester on line 6—6 of Figure 1;

Figure 7 is a fragmentary elevation of the right-hand part of that portion of the device shown in Figure 6;

Figure 8 is a longitudinal, vertical section through the horizontal supporting bar of the appliance on which the pair of screens is adjustable;

Figure 9 is a detailed, enlarged, vertical section on line 9—9 of Figure 1 showing the distance-measuring mechanism;

Figure 10 presents on an enlarged scale a vertical section through one of the screens and shows the mounting of one of the distance or measuring rods;

Figure 11 is a horizontal section on line 11—11 of Figure 10;

Figure 12 is a fragmentary face view of one of the two screens with its measuring rod in horizontal relation and shown in section;

Figure 13 is a vertical section illustrating the counterbalancing means for the adjustable photoelectric-cell part of the apparatus.

Referring to these drawings, it will be seen that the new apparatus includes a three-legged base 11, one foot or leg 12 of which extends forwardly, the other, two, companion legs or feet 13, 14 diverging rearwardly, all as is clearly shown, each such foot or leg having a supporting wheel or roller 15, whereby the appliance as a whole may be readily moved around on the floor of a garage or automobile testing station.

The center of such base is socketed at 16 for the reception and tight fit therein of the lower end of an upright column or standard 17 square in cross-section, and the base inside of its hollow leg 12 accommodates a substantially-horizontal brake-lever 18 fulcrumed in such leg at 19 and equipped at its forward end with a downwardly-directed, terminal brake-part 21 adapted under certain conditions to bear against the periphery of the carrying-wheel 15 of the specified leg to prevent the apparatus from unintentionally moving on the floor or pavement, a depending part 22 of the base being recessed at 23 for the accommodation of the brake-lever foot-piece or pedal 25 in its upper inoperative position and being also provided with a shoulder 24 under which the foot-piece may be shifted sidewise and maintained to keep such brake in frictional contact on the wheel until it is intentionally released.

Obviously, by depressing the part 25 and shifting it slightly sidewise beneath the shoulder 24 the brake may be applied to the wheel and maintained in such relation until released by reverse movement of the foot-piece, thus moving it away from the shoulder 24 and allowing it to rise in the recess 23, it being apparent from the drawing that the fulcrum is so located that the brake-section of the lever is farther from the fulcrum than the foot-piece portion.

A bracket or casting 26, having a square opening therethrough receiving the post or standard 17, is vertically adjustable on such column and may be held at the desired height thereon by a thumb set-screw 27 occupying a threaded hole through the bracket and adapted to bear at its inner end against the adjacent surface of the post.

In order to counterbalance such bracket and the parts hereinafter referred to which it carries and to facilitate the up-and-down adjustment thereof, the top part of the hollow standard is fitted with a revoluble sprocket-wheel 28 equipped with an external, readily-accessible operating-knob 29 by which the wheel may be turned, a sprocket-chain 31 fastened at one end to the bracket 26 passing over and coacting with such wheel and having its other end attached to one end of a counterbalancing-spring 32 inside of the standard and secured at its other end to such member.

Thus, assuming that the set-screw 27 is released, the operator may readily vary the height of the bracket and its associated elements by merely turning the knob, whereupon the thumb-screw may again be tightened to maintain the adjustment.

Bolted or otherwise fixedly fastened at its middle to the bracket or casting 26 is a comparatively-long, horizontal, hollow bar 33 square in cross-section and providing a support for a pair of screens and for the photoelectric-cell device referred to in detail below.

Each such screen 34, 34 is mounted on its individual casting 35 apertured to fit and to be slidable along the bar 33, the latter being slotted through its top and bottom walls as at 36 and 37, the two screens being on opposite sides of the column as shown.

In order that the pair of screens may be equally and simultaneously adjusted horizontally toward and from one another on the bar as occasion requires, they are coupled together by a sprocket-chain mechanism and to this end an endless sprocket-chain 38 inside of bar 33 passes around appropriately-mounted, revoluble sprocket-wheels 39 and 41 inside of the end portions of the bar, and, to permit the chain to be readily moved, sprocket-wheel 39 is equipped with a turning-knob 42 located outside of the bar.

Casting 35 of one screen 34 is fastened by a screw 43 extended through slot 36 to a link in one length or stretch of the sprocket-chain 38, and, in similar manner, the like casting 35 of the companion screen 34 is secured through slot 37 to the other length of the same chain by screw 44.

From the foregoing, it will be apparent that, by turning the knob 42 in one direction or the other, the two screens may be made to approach one another at the same time and in equal degree, or to separate from one another in like manner.

Each casting 35 has a bent, measuring or distance rod or bar 45 hinged therein at 46, the rod extending forwardly through a vertical slot 47 through the upper portion of the middle of the corresponding screen, the end of the rod carrying a rubber-tip 48, a finger-piece end 49 of the rod projecting out through a slot 51 in the casting, the latter internally having a cam shoulder 52 the shaft of which may be turned in its bearing 50 in the casting for fine adjustment of the position of the shoulder, such shaft being held in adjusted position by a set-screw 50a.

The fulcrum-pin fixed to each such rod is equipped with an encircling, coiled spring 53 bearing at one end against the inner wall of the casting and at its other end against the rod tending to shift the latter and its supporting shaft sidewise in its bearings.

When the finger-piece 49 is pressed down, the rod is raised to exactly horizontal position as determined by the adjustable shoulder 52 and as shown in dotted lines in Figure 2, and the rod is pushed automatically sidewise slightly by its spring to carry the finger-piece beneath the shoulder 52 with the result that the rod projects forwardly from the screen in horizontal relation, and when it is desired to release the rod and to allow it to drop to normal, inoperative, vertical relation as shown in Figure 1, the operator shifts the rod slightly sidewise against the action of its spring to free it from the retaining shoulder.

Each screen on its front, highly-reflective face has a horizontal line 54, a shorter horizontal line 55 two inches below line 54, a vertical line 56 at the middle of the screen, and a vertical line 57 at one side thereof, the measuring-rod, when elevated to horizontal position, registering exactly with the point of intersection of lines 54 and 56, and when such rod is in vertical, inoperative position, it is exactly in front of line 56.

The top end of post or standard 17 has a sighting-appliance similar to the two sights of a gun, and, in this instance, such device comprises as one part a ring 61 fitted with a vertical wire 62, and as the correlative part, a notched aperture 63 in the upright 64, these two sights being in a plane at exactly a right-angle to the plane of the two screens, both screens being in the same vertical plane.

It will be noticed that the three carrying-wheels 15 are at right-angles to the plane of these screens, and one of these wheels is equipped with a simple, mechanical, measuring device to position the screens at a predetermined distance in front of the headlights undergoing test.

To this end, the shaft 71 of one of the wheels 15 turns with the wheel and it has a small gear 72 fixed thereon and normally in mesh with a larger gear 73 revolubly mounted on a stud or shaft 74 on one arm of a bell-crank lever 75 fulcrumed at 76 on an upright 70 of the base, the other arm 77 of the bell-crank constituting a foot-piece by means of which the larger gear may temporarily be raised out of cooperative relation with the lower, smaller gear, as shown in dotted lines in Figure 9.

As is also indicated in the same figure, such major gear is unbalanced in that it has a hole 78 therethrough and in radial register with the center of such aperture a face of the gear 73 has an index mark 79 designed to coact with a fixed pointer or marker 81 on the base on the part 70.

From what precedes, it will be apparent, that, if the operator presses the arm 77 with his foot, gear 73 will be lifted out of mesh with its driving-gear 72, and, then being free to turn on its shaft 74, and due to its unbalanced condition with relation to such shaft, the gear will automatically revolve by gravity about its own axis to bring its mark 79 into register with the pointer 81, whereupon the foot-piece 77 may be released to again mesh the gears together.

Gear 73 constitutes a mechanical, measuring device in that, since the diameter of the roller 15 is known, and since one of such wheels or rollers is directly geared to the index-gear 73, if such wheeled base of the apparatus is moved or rolled along a straight path such a distance that the gear 73 will have made one complete revolution as displayed by its mark 79, such movement of the appliance will have been a known amount, and, of course, if the apparatus is thus rolled along sufficiently to revolve gear 73 twice, then, of course, the appliance will have traveled a definite and predetermined distance.

The photoelectric-cell part of the mechanism comprises an upright plate 82 equipped with a top handle 83 and a pair of rollers 84, 84 by means of which the plate may be applied to or mounted on the front of either of the two screens and readily movable therealong by reason of the supporting rollers 84, 84 which travel on the top edge of the screen.

In the preferred construction, the plate 82 is secured at its upper end to a U-shaped casting of which a part comprises the handle 83, the casting straddling the top portion of the screen to hold the plate in proper position and fitted internally with the specified anti-friction wheels or rollers 84, 84.

Slidable or adjustable up and down on this vertical plate is a skeleton casting 85 grooved to receive and to be guided by the upright edges or margins of the plate, such casting being counter-balanced by a weight 86 in a casing to the rear of the plate and to which weight it is operatively connected by a cord 87 passing over a suitable pulley or sheave 88 occupying a hole through the plate.

Thus the casting, which is fitted at its top with an operating handle or knob 89, may be vertically adjusted on the plate with ease and facility.

At its lower part, this casting is formed as a tube 91 open at its front end for the admission of light and internally accommodating a photoelectric-cell 92 of any appropriate character on which the light may act and electrically connected in the usual manner to a micro-ammeter 93 mounted on the casting and provided with an arcuate scale graduated in thousands of candle-power, one section 94 of the scale being marked or colored to indicate "poor" illumination, a middle section 95 of the scale designating "good" illumination, and a third section 96 representing "excellent" illumination, such instrument having a needle 97 coacting with such scale to show the strength of light imposed on the cell, such needle, by means of a knob 98 being adjustable to compensate for the daylight which may in some degree affect the cell at the location where the headlights are to undergo test.

Stated somewhat otherwise, the operator, by means of the knob 98, may turn the needle back to zero on the scale to eliminate any reading thereon due to daylight or light other than that from the headlight, so that when the latter is tested, the reading on the scale designated by the needle will be that of the headlight only.

This ammeter is also equipped with another needle 99, which by means of its knob 101, may be turned to any position on the scale where it will remain until otherwise manually adjusted to a new position.

In addition, the tubular part 91 of the casting is fitted with a vertically-adjustable shield or apertured diaphragm 102 having a round hole 103 which may be slid down in front and into register with the photoelectric-cell by means of a rod 104 and its handle 105, the diaphragm being mounted on such rod in any approved manner, or the diaphragm may be pushed up out of the way as shown in Figure 1, in order to increase or decrease the amount of light reaching the cell.

On its left-hand side, the plate 82 has a vertical scale 106 graduated in inches drop in 25 feet, the zero of such scale registering with the screen horizontal line 54, the graduation marks extending both up and down from such zero line, a pointer 107 on casting 85 cooperating with such scale.

On the right-hand side of the same plate 82, another vertically-arranged scale 108 is provided and graduated in feet of road illumination, indicating the distance ahead of the car that the headlamp light-beam will strike the road, a pointer 109 on the casting 85 coacting with such scale.

The new and improved headlight-tester is operated substantially as follows:

The appliance is placed in front of the automobile the headlamps of which are to undergo examination and the operator, by depressing the handles 49, elevates both of the measuring or distance rods 45 to horizontal position, whereupon by turning knob 29 he adjusts the elevation of the two screens and such rods until the latter are at the same height as the centers of the lenses of the headlamps of the car, and, by turning knob 42, he moves the two screens and their rods toward or from one another until the rods are spaced apart the same distance as the centers of the two lenses.

By proper shifting of the position of the whole apparatus and by suitable adjustment of the two screens and their associated measuring and positioning rods, the rubber-tipped ends of the latter are caused to contact simultaneously with the exact centers of the two lenses of the automobile headlights as shown in Figure 3.

It is then known that the pair of screens are at a predetermined distance in front of the headlamps, that the two screens are at exactly a right-angle to the length of the car, that the horizontal lines 54, 54 of the screens are at the same height as the centers of the lenses, and that the vertical lines 56, 56 are in register with the centers of the lenses.

Such adjustments having been made, the thumb-screw 27 is tightened to preclude any up or down movement of the screens and the parts which they carry, there being no danger of lateral shifting of the screens so long as the knob 42 is not turned.

It becomes necessary now to move the whole appliance away from the headlamps an amount so that the final positions of the screens will be a definite distance, in the present instance ten feet, away from the lamps, and this movement is accomplished without the use of any foot rules, scales, or optical range-finder in the following manner.

The operator depresses the foot-piece 77 thus raising gear 73 out of mesh with its smaller drive-gear 72, and, owing to the unbalanced condition of such larger gear, it automatically swings or rocks on its shaft 74 bringing its mark 79 into register with the pointer 81, whereupon the operator releases the foot-piece and the larger gear rocks down into meshing relation with gear 72.

Now the operator rolls the whole apparatus straight away from the headlamps until the gear 73 has made two complete revolutions as occasioned by the turning of gear 72 by its roller or wheel 15 to which it is operatively connected, the completion of these two revolutions being easily seen when the mark 79 on the second rotation of the gear comes opposite the point 81.

The two screens will now be exactly ten feet in front of the lamps and the person making the test now applies the brake 21—18—25 to the corresponding wheel locking the part 25 of the brake beneath the shoulder 24, so that there is no danger of unintentional displacement of the appliance.

The operator, for safety's sake, may check the right-angle relation of the screens to the lengthwise dimension of the car by sighting through the device 63, 62 along the center of the hood or hinge of the hood of the automobile or along any other center part of the car, and, if any adjustment of the screens is required as disclosed by such examination or check, it can be readily made by slightly turning the whole apparatus as may be required.

Upon completion of such exact positioning of the tester, the measuring-rods having been first released and rocked down into vertical position where they are exactly in front of the upright lines 56, 56, and the lamps of the headlights having been illuminated, the patterns of their light-beams may be studied on the screens.

Thereupon, the photoelectric-cell part of the apparatus is applied to one of the screens and the knob 98 thereof turned to bring the needle 97 to zero position on the scale to offset or neutralize the effect of any light present which does not come from the illuminated headlamps, the latter, of course, being turned off for the time being for this preliminary adjustment and then turned on again.

The light-responsive cell and its ammeter are now moved up and down and sidewise on the screen until the highest reading on the ammeter is discovered and then the supplemental needle 99 is moved to that position and allowed to remain thereat.

If the photoelectric-cell is in proper position, as shown by the vertical line 56 and by the scale 106 and its pointer 107 or the other scale 108 and its pointer 109, when such maximum ammeter reading is secured, then the position of the light-beam from that particular headlamp is correct and all that need be done, if the reading on the ammeter is low, is to attempt to increase the illumination from such lamp by inserting a new bulb, by polishing the reflector, or by adjustment of the focusing means if such is present.

If the position of such photoelectric-cell shows that the aim of the beam is incorrect, when such maximum reading has been ascertained and the needle 99 adjusted, then the cell is put in the proper position as shown by vertical line 56 and by one of the two scales 106 and 108 and its pointer and the headlamp is adjusted until the ammeter reading rises to such maximum again which shows that the "hot spot" of the beam, which is usually two inches below the top of the beam at a distance of ten feet in front of the illuminated lamp, is correctly aimed.

State and other requirements with respect to the aim or drop of headlight beams ordinarily apply to the top of the beam, but this is difficult to locate and the present tester works with the "hot spot" of such beam, the top of the latter ordinarily being a definite distance from the "hot spot" at a predetermined distance ahead of the lamp and this is the reason why the photo-electric-cell is below the line 54 when the pointer 107 registers zero on scale 106.

The vertical lines 57, 57 are used to test lamps whose beams are shifted sidewise, as when passing another car.

One of the two headlamps having been tested in the manner indicated, the photoelectric-cell device is placed on the other screen and the companion headlight examined in the same manner.

Both lamps having undergone test and their deficiencies, if any, indicated or corrected, the brake on the wheel is released and the two screens are shifted into their contracted positions whereupon the appliance will occupy a minimum of space when not in use.

As will be readily understood by those skilled in this art, the invention is not necessarily limited and restricted to the precise and exact details of structure and these may be modified within reasonable limits without departure from the invention as defined by the appended claims and without the sacrifice of any of its material benefits and advantages.

I claim:

1. In an automobile headlamp-tester adapted to be positioned in front of the headlamps of the automobile to be examined, the combination of a support, a screen mounted on said support, the front face of such screen being adapted to reflect the light-rays played thereon by the illuminated headlamp, said screen having on its front face a horizontal reference-line and a vertical-reference line, said two lines intersecting on said screen, a manually-operated measuring-rod fulcrumed on said screen to swing in a vertical plane, releasable means for maintaining said rod projecting forwardly horizontally from the front face of said screen in register with said intersection, said rod when released falling into inoperative position, and means to adjust said screen and rod to register the latter with the headlamp.

2. In a portable automobile headlamp-tester, the combination of a standard, a base on which said standard is mounted, carrying-wheels on said base, a horizontal support vertically adjustable on said standard, a pair of screens arranged horizontally end-to-end in the same vertical plane on said support on opposite sides of said standard and adapted to reflect from their front faces the light-rays from the illuminated headlamps undergoing examination, said screens being parallel to the axes of said carrying-wheels, means to adjust said screens toward and from one another horizontally on said support equally and simultaneously while maintaining their vertical relation, a horizontal reference-line on the front face of each of said screens, a vertical reference-line on the front face of each of said screens and intersecting the corresponding horizontal line, photo-electric-cell means adjustable horizontally and vertically over the front faces of said screens, indicator-means connected to said cell-means to show the strength of light imposed on said cell-means, a measuring-rod on each of said screens and movably mounted thereon to project operatively horizontally from the front face of the screen coincident with the intersection of said horizontal and vertical lines of the screen and to move into an inoperative position, means to hold said rods releasably in said horizontal positions, whereby said screens may be positioned at a definite distance in front of the two headlamps and at a right-angle to the length of the automobile and with the intersecting lines of the screens registering with the centers of the headlamps by the measuring-rods engaging the centers of the headlamp-lenses, and mechanical measuring-means mounted on the tester and operated by one of said carrying-wheels to indicate when said tester-screens have been moved in a straight path to a predetermined distance in front of the headlamps.

IRA A. WEAVER.